United States Patent
Aronowitz et al.

(10) Patent No.: US 9,113,265 B2
(45) Date of Patent: Aug. 18, 2015

(54) PROVIDING A CONFIDENCE MEASURE FOR SPEAKER DIARIZATION

(75) Inventors: Hagai Aronowitz, Petah-Tikva (IL); Orith Toledo-Ronen, Tel-Aviv (IL)

(73) Assignee: International Business Machines Corporation, Armonk, NY (US)

( * ) Notice: Subject to any disclaimer, the term of this patent is extended or adjusted under 35 U.S.C. 154(b) by 527 days.

(21) Appl. No.: 13/557,226

(22) Filed: Jul. 25, 2012

(65) Prior Publication Data

US 2014/0029757 A1    Jan. 30, 2014

(51) Int. Cl.
*G10L 17/00* (2013.01)
*H04R 29/00* (2006.01)
*G10L 17/02* (2013.01)
*G10L 17/06* (2013.01)

(52) U.S. Cl.
CPC ............... *H04R 29/00* (2013.01); *G10L 17/00* (2013.01); *G10L 17/02* (2013.01); *G10L 17/06* (2013.01)

(58) Field of Classification Search
CPC .......... G10L 17/00; G10L 17/02; G10L 17/06
USPC ................................................ 704/246–250
See application file for complete search history.

(56) References Cited

U.S. PATENT DOCUMENTS

| | | | |
|---|---|---|---|
| 5,973,643 A * | 10/1999 | Hawkes et al. | 342/457 |
| 2009/0319269 A1* | 12/2009 | Aronowitz | 704/243 |
| 2011/0251843 A1 | 10/2011 | Aronowitz | |
| 2011/0320197 A1 | 12/2011 | Conejero et al. | |

OTHER PUBLICATIONS

Vaquero et al., "Partitioning of Two-Speaker Conversation Datasets", in Proc. Interspeech 2011, pp. 385-388.*
Vaquero et al., "Confidence Measure for Speaker Segmentation and their Relation to Speaker Verificaiton", in Proc. Interspeech, 2010, pp. 2310-2313.*
Aronowitz, "Unsupervised Compensation of Intra-Session Intra-Speaker Variability for Speaker Diarization", in Proc. Speaker Odyssey, 2010.*
Bassiou et al., "Speaker Diarization Exploiting the Eigengap Criterion and Cluster Ensembles" In Proceedings of IEEE Transactions on Audio, Speech & Language Processing, pp. 2134-2144, 2010.
Vaquero et al., "Confidence measures for speaker segmentation and their relation to speaker verification", in Proc. Interspeech, pp. 2310-2313, 2010.
Ulrike von Luxburg, "A tutorial on spectral clustering", Mathematics and Statistics, Statistics and Computing, vol. 17, No. 4, pp. 395-416, 2007.
Huazhong et al., "A spectral clustering approach to speaker diarization", in Proc. 9th Int. Conf. Spoken Language Processing (ICSLP), Pittsburgh, Pennsylvania, 2006.
Hagai Aronowitz, "Unsupervised Compensation of Intra-Session Intra-Speaker Variability for Speaker Diarization", in Odyssey, 2010.
Scott Otterson, "Use of Speaker Location Features in Meeting Diarization", University of Washington, Program Authorized to Offer Degree: Electrical Engineering, 2008.
Arberet et al., "A Robust Method to Count and Locate Audio Sources in a Multichannel Underdetermined Mixture" IEEE Transactions on Signal Processing, vol. 58, No. 1, Jan. 2010.

* cited by examiner

*Primary Examiner* — Samuel G Neway

(57) ABSTRACT

Method, system and computer product are provided for a computer implemented method for providing a confidence measure for speaker diarization. The method includes: receiving an audio session as unsegmented audio data; computing a spectral ratio of principal component analysis (PCA) of sections of the received audio session by a ratio between the largest eigenvalue and the second largest eigenvalue; using the PCA spectral ratio as a confidence measure for speaker diarization processing.

23 Claims, 4 Drawing Sheets

PROVIDING A CONFIDENCE MEASURE FOR SPEAKER DIARIZATION

BACKGROUND

This invention relates to the speaker diarization. In particular, the invention relates to providing a confidence measure for speaker diarization.

Speaker diarization aims at segmenting a conversation into homogenous segments in which only one speaker presents and then clustering the segments based on speaker identity. In other words, speaker diarization answers the "Who spoke when?" question for a given audio signal. State-of-the-art algorithms find the speaker turn points and cluster the segments.

Speaker diarization is an important component in many speech applications such as two-wire telephony audio analytics, meeting and lecture summarization, and broadcast processing and retrieval.

A speaker diarization system usually consists of a speech/non-speech segmentation component, a speaker segmentation component, and a speaker clustering component.

Speaker segmentation is the process of identifying change points in an audio input where the identity of the speaker changes. Speaker segmentation is usually done by modeling a speaker with a multivariate normal distribution or with a Gaussian mixture model (GMM) and assuming frame independence. Deciding whether two consecutive segments share the same speaker identity is usually done by applying a Bayesian motivated approach such as Generalized Likelihood Ratio (GLR) or Bayesian Information Criterion (BIC).

Speaker clustering is the process of clustering segments according to speakers' identity. Speaker clustering is usually based on either the BIC criterion or on Cross Likelihood Ratio (CLR).

Intra-speaker variability is the variation of characteristics in a single speaker's output. Compensating for intra-speaker variability can enable more accurate speaker segmentation and clustering.

Confidence measures for speaker diarization generally use the segmentation output as input to the confidence computation. Such known methods include: the Bayesian Information Criterion (BIC) measure of the segmentation accuracy, the Kullback-Leibler divergence measure of the distance between the distributions of the two segmented speakers, the convergence rate of the segmentation algorithm.

BRIEF SUMMARY

According to a first aspect of the present invention there is provided a computer implemented method for providing a confidence measure for speaker diarization, comprising: receiving an audio session as unsegmented audio data; computing a spectral ratio of principal component analysis (PCA) of sections of the received audio session by a ratio between the largest eigenvalue and the second largest eigenvalue; using the PCA spectral ratio as a confidence measure for speaker diarization processing.

According to a second aspect of the present invention there is provided a computer program product for providing a confidence measure for speaker diarization, the computer program product comprising: a computer readable storage medium having computer readable program code embodied therewith, the computer readable program code comprising: computer readable program code configured to: receive an audio session as unsegmented audio data; compute a spectral ratio of principal component analysis (PCA) of sections of the received audio session by a ratio between the largest eigenvalue and the second largest eigenvalue; use the PCA spectral ratio as a confidence measure for speaker diarization processing.

According to a third aspect of the present invention there is provided system for providing a confidence measure for speaker diarization, comprising: a processor; a session receiver and dividing component for receiving an audio session as unsegmented audio data and dividing it into sections; a spectral ratio component for computing a spectral ratio of principal component analysis (PCA) of the sections of the received audio session by a ratio between the largest eigenvalue and the second largest eigenvalue; a confidence measure applying component for using the PCA spectral ratio as a confidence measure for speaker diarization processing.

BRIEF DESCRIPTION OF THE SEVERAL VIEWS OF THE DRAWINGS

The subject matter regarded as the invention is particularly pointed out and distinctly claimed in the concluding portion of the specification. The invention, both as to organization and method of operation, together with objects, features, and advantages thereof, may best be understood by reference to the following detailed description when read with the accompanying drawings in which:

Figure 1:
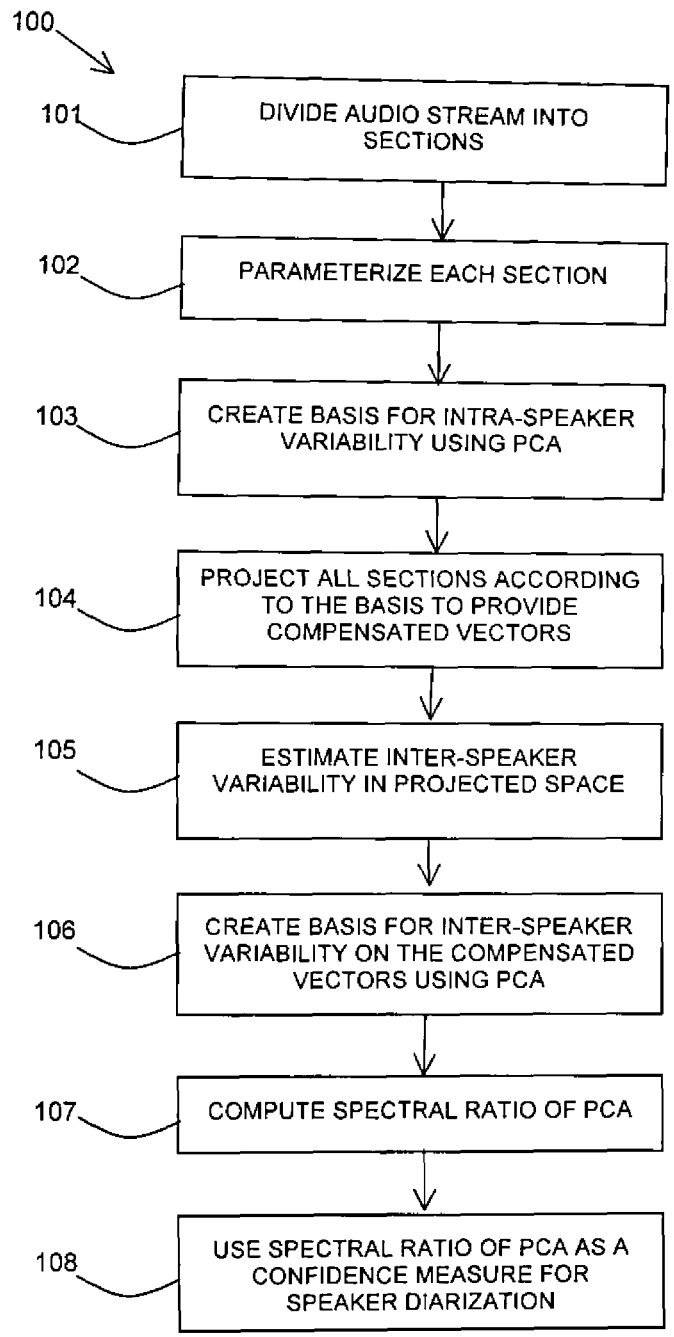
FIG. 1 is a flow diagram of a method of providing a confidence measure of speaker diarization in accordance with the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numbers may be repeated among the figures to indicate corresponding or analogous features.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Unsegmented speech data of a conversation or audio session is used to produce a confidence measure which may be used for a diarization process. Any length of audio session may be input on which a confidence measure is required.

An independent confidence measure may be provided for a segmentation obtained by the speaker diarization algorithm. The method does not depend on the specific diarization algorithm in use because it operates on the unsegmented audio data of the session. The efficiency and low latency of the confidence measure estimation (the fact that it does not require a segmentation) is a major advantage of the method.

Referring to FIG. 1, a flow diagram 100 shows an embodiment of the described method. Steps 1 to 6 (101 to 106) are known from a prior art speaker diarization algorithm.

Step 1. An audio session is input in the form of an unlabelled audio stream and is divided 101 into sections. In one embodiment, the sections may be evenly spaced and may be overlapping. In another embodiment, a change-detector may be used to determine sections.

Step 2. Each section is parameterized 102, for example, by a Gaussian Mixture Model (GMM).

Step 3. A basis is created 103 for the intra-speaker variability using a Principal Component Analysis (PCA) technique. In this step, the intra-speaker variability is estimated on the difference vectors.

Step 4. All sections are projected 104 according to the basis created in Step 3 to compensate the vectors for the estimated intra-speaker variability.

Step 5. The inter-speaker variability is estimated 105 in projected space on the compensated vectors (after the intra-speaker variability has already been removed in Step 3 ).

Step 6. A basis for the inter-speaker variability on the compensated vectors is created 106 using PCA.

Step 7. A spectral ratio of the PCA is computed 107, which is the ratio between the largest eigenvalue and the second largest eigenvalue.

Step 8. The PCA spectral ratio computed in Step 7 may be used 108 as a confidence measure for speaker diarization for the input audio session.

A speaker diarization may be carried out using the method of steps 1 to 6 and some extra steps for diarization and using the projection on the largest eigenvector of the PCA. However, the confidence measure calculation does not rely on the diarization output and different methods of diarization may be used. The confidence measure may be computed on all the audio before diarization occurs.

Figure 2:
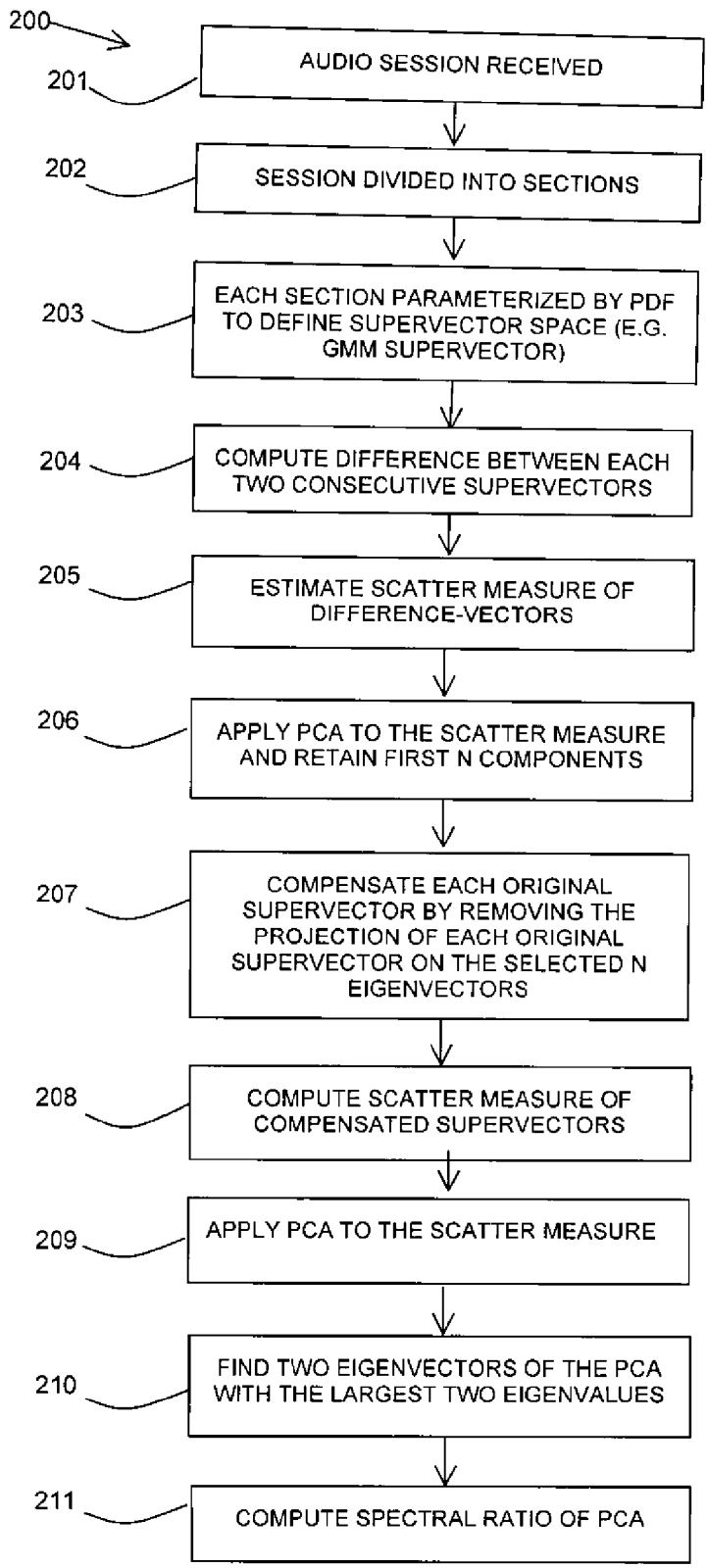
FIG. 2 is a flow diagram of an example embodiment of the method FIG. 1 in accordance with the present invention.

Referring to FIG. 2, a flow diagram 200 shows an example embodiment of the described method of providing a confidence measure for an audio session which may be applied to speaker diarization. Correspondence of steps in FIG. 2 to the steps of FIG. 1 are indicated.

Step 1 from FIG. 1 may be provided by an audio session being received 201 and the audio session being divided 202 into sections, for example, into equally spaced sections of duration x (typically in the range of 0.5-5 seconds) with an optional overlap of y (typically in the range of 0-90%). The duration x of the sections may be chosen to be shorter than a typical speaker identity change and long enough to capture intra-speaker variability. For example, the duration x may be 1 second with the overlap of y as 90%.

Step 2 from FIG. 1 may be provided by each section being parameterized 203 by a time dependent probability density function (PDF) to define a supervector space. In one embodiment, a GMM-supervector framework is used. A GMM-supervector is a common representation for speech sessions in speaker recognition which is a high-dimensional vector.

Step 3 from FIG. 1 may be provided by computing the difference between each two consecutive supervectors 204. The covariance matrix or any other scatter measure of these difference-vectors may be estimated 205 and is actually the estimate of intra-speaker variability in this particular spoken session.

In one embodiment, PCA (Principal Component Analysis) is applied 206 to the scatter measure (for example, the covariance matrix) and only the first n components are retained (for example, a typical range of n is 1-100).

Step 4 of FIG. 1 may be provided by compensating intra-speaker variability—each original supervector may be compensated 207 by removing the projection of each original supervector on the selected n eigenvectors. For example, n=10. This technique is called NAP—Nuisance Attribute Projection.

Step 5 of FIG. 1 may be provided by computing 208 a scatter measure of the compensated supervectors, for example, by computing the covariance matrix of the GMM-supervectors (note: not the difference vectors).

Step 6 of FIG. 1 may be provided by applying PCA to the scatter measure 209 to compute basis for inter-speaker variability on the compensated vectors. The result of the PCA transformation is the eigenvectors with their corresponding eigenvalues.

Step 7 of FIG. 1 may be provided by finding 210 the two eigenvectors of the PCA with the largest two eigenvalues and computing 211 the spectral ratio of the PCA. The spectral ratio is the ratio between the largest eigenvalue and the second largest eigenvalue.

Step 8 of FIG. 1 is provided by using the PCA spectral ratio computed as a confidence measure which may be applied to speaker diarization.

A large spectral ratio value indicates that the separation of the two speakers will be good.

A low spectral ratio value indicates that the separation is not good.

An eigengap technique may be used for finding the number of clusters in data. Data clustering is widely used in many areas and not only for speech. However, the described method is about using the spectral ratio computed from the unsegmented data as a confidence for speaker diarization as opposed to analysis techniques performed on the clustered data.

The Model—This describes Step 2 of FIG. 1 above in detail

A speaker S may be modelled in a particular session with a dynamic generative process represented by a time-dependent probability density function (PDF) $S_t$. $S_t$ represents the PDF (GMM in practice) used to generate the observation at time t. Assuming a memory-less generative process, a speaker in a given session may be modeled by a single PDF over the GMM space. This is contrary to advanced speaker-recognition approaches which model a speaker in a given session with a single GMM. The randomness introduced by the PDF is a result of intra-session intra-speaker variability.

A GMM-supervector framework may be followed to define a supervector space. The supervector space may be induced by a universal background model (UBM) trained for the currently processed session using standard EM (Expectation-Maximization) training. Restricting all GMMs to be adapted from the UBM, every GMM may be mapped to the supervector space by concatenating the means of the GMM in a fixed order.

In the supervector space, it may be assumed that the supervector $s_t$ (in time t) is a sum of three independent random supervectors as shown in Equation (1).

$$s_t = s + ux_t + dz_t \quad (1)$$

Supervector s is the expectation of the PDF of speaker S in the supervector space, u is a rectangular matrix of low rank which is the intra-speaker covariance matrix (assumed to be of low rank). Random supervector $x_t$ has a standard normal distribution and its components represent instantaneous intra-speaker factors. Matrix d is a diagonal covariance matrix which models residual intra-speaker variability not captured by the low rank subspace of u. Random supervector $z_t$ has a standard normal distribution and its components represent instantaneous residual intra-speaker factors. It is assumed that covariance matrices u and d are speaker independent. However, they are estimated independently for every session.

Speaker supervector s may be assumed to be drawn from a speaker population and distributes according to Equation (2);

$$s = m + vy \quad (2)$$

where m is the UBM supervector, v is a rectangular matrix which is the inter-speaker covariance matrix. Random supervector y has a standard normal distribution and its components represent speaker factors.

It may be assumed that the intra-speaker variability subspace induced by matrix u and the speaker-space induced by v are disjoint. Other than that, matrix v is not estimated and speaker-space information is not used. The motivation for this assumption is that it enables development of an algorithm that does not require any development data for estimating the inter-speaker covariance matrix.

Estimating the Instantaneous GMM Supervectors ($s_t$)

Referring to step 203 of FIG. 2, in order to estimate the GMM-supervector at frame t, a duration threshold δ may be set and it is assumed that during the section [t−δ/2, t+δ/2] there is no speaker change and that the GMM distribution $S_t$ does not change significantly during the section. Supervector $s_t$ is estimated using standard MAP (Maximum A-Posteriori)-adaptation of the UBM (assuming intra-speaker covariance matrix u=0). Alternatively other estimation methods such as factor analysis may be used. Although this approach is less accurate, it is simpler and more efficient in terms of run-time.

Estimating the Intra-Speaker Covariance Matrices (u, d)—Step 3 of FIG. 1 in Detail Referring to steps 204 and 205 of FIG. 2, given a sequence of GMM-supervectors $s_1, \ldots, s_T$ estimated for a session of length T (frames), $\epsilon_t$ is defined as the difference of two consecutive supervectors ($\epsilon_t = s_{t+1} - s_t$). The expectation of $\epsilon_t$ equals to zero due to symmetry, which leads to Equation (3):

$$\text{cov}(\epsilon_t) = E(\epsilon_t \epsilon_t^t) \quad (3)$$

Defining t* as the set of frames where a speaker change occurs (between frames t and t+1), the following expression is obtained:

$$E(\varepsilon_t \varepsilon_t^t) = Pr(t^*) E_{t \in t^*}(\varepsilon_t \varepsilon_t^t) + (1 - Pr(t^*)) E_{t \notin t^*}(\varepsilon_t \varepsilon_t^t) \quad (4)$$

$$= 2[Pr(t^*)vv^t + uu^t + d^2]$$

Assuming that the prior probability of a speaker change in an arbitrary frame is small (Pr(t*)<<1):

$$\tfrac{1}{2} E(\epsilon_t \epsilon_t^t) \cong uu^t + d^2 \quad (5)$$

The value of Pr(t*) is a function of the expected speaker turn length (L) and segment length (δ), $$Pr(t^*) = \frac{\delta/2}{L - \delta/2} \quad (6)$$

For conversational speech, L is in the order of 3 sec, δ is set to 1 sec. Pr(t*) would hence be equal to 0.2. The approximation used for deriving Equation (5) is therefore reasonable.

In conclusion, intra-speaker variability may be approximately estimated as half of the empirical covariance matrix of the difference supervectors $\{\epsilon_t\}$. Decomposition of the intra-speaker variability into matrices u and d may be done using standard techniques such as principal component analysis (PCA) or probabilistic PCA.

Referring to step 206 of FIG. 2, in one embodiment, PCA is applied to the intra-speaker variability covariance matrix and the eigenvectors used corresponding to the largest eigenvalues to form matrix u. Matrix d is estimated as a scalar matrix from the residual of the empirical intra-speaker variability covariance matrix, after removing the low rank subspace spanned by matrix u.

Intra-Speaker Variability Compensation—Step 4 of FIG. 1 in Detail

Referring to step 207 of FIG. 2, given a sequence of GMM-supervectors $s_t, \ldots, s_T$ estimated for a session of length T (frames), the intra-speaker covariance matrices (u, d) are first estimated. The supervector-subspace induced by u which is assumed to be disjoint from the inter-speaker subspace (induced by v) may be compensated by removing the projection of a supervector $s_t$ onto the subspace induced by u.

$$c_t = (I - \tilde{u}\tilde{u}^t) s_t \quad (7)$$

In Equation (7) ũ is a matrix that consists of the eigenvectors of matrix u, and $c_t$ is the resulting compensated supervector. The residual intra-speaker variability is not compensated as it is not disjoint to the inter-speaker space.

Confidence Calculation—Steps 5 to 7 of FIG. 1 in Detail

Referring to step 208 of FIG. 2, after intra-speaker variation is compensated, it is assumed that the dominant source of variability in the supervector-space is the speaker identity. The covariance matrix of the compensated supervectors is calculated and PCA is applied to the covariance matrix, as indicated in step 209 in FIG. 2. The result of the PCA transformation is the eigenvectors with their corresponding eigenvalues.

For computing the confidence, only the first two eigenvectors are required, which are the two eigenvectors with the largest eigenvalues, as shown in step 210. In the final step of producing the confidence measure, as indicated in step 211, the first and second largest eigenvalues are used for calculating the confidence measure. The largest eigenvalue ($\lambda_1$) and the second-largest eigenvalue ($\lambda_2$) are taken and the spectral ratio is computed:

$$R = \lambda_1 / \lambda_2 \quad (8)$$

The spectral ratio R is used as the confidence measure.

In two-speaker conversations, the described confidence measure correlates with the diarization accuracy and can be used to measure the quality of the segmentation. High confidence value indicates that the separation between the two speakers will be good, while very low confidence value indicated that the segmentation of the two speakers is not good.

One advantage of the described method is a potential increase in speaker diarization accuracy. For example, in a call center audio analytics scenario, the confidence measure may be used to filter out some bad segmentation outputs and by doing so increase the diarization accuracy on the remaining calls. The filtering may be done by calculating the confidence measure for each call with the described method and removing the calls with low confidence. As a result, the overall diarization accuracy increases on the remaining set of calls.

The confidence measure may be used to classify between single speaker and two speaker utterances.

Moreover, the described confidence measure is useful not only for offline processing but also for online speaker diarization. In online processing, the audio from the beginning of the call may be used for building the initial diarization models of the speakers in the call. If the initial audio call prefix is too short, then it may be that only one speaker is present in it. The proposed confidence measure may detect that situation and indicate that more audio data is needed before performing the segmentation of the call, and by doing so increase the overall accuracy of online speaker diarization. On the other hand, it may indicate when the initial call prefix contains a sufficient amount of audio for the diarization, and by that reduce the computation.

Figure 3:
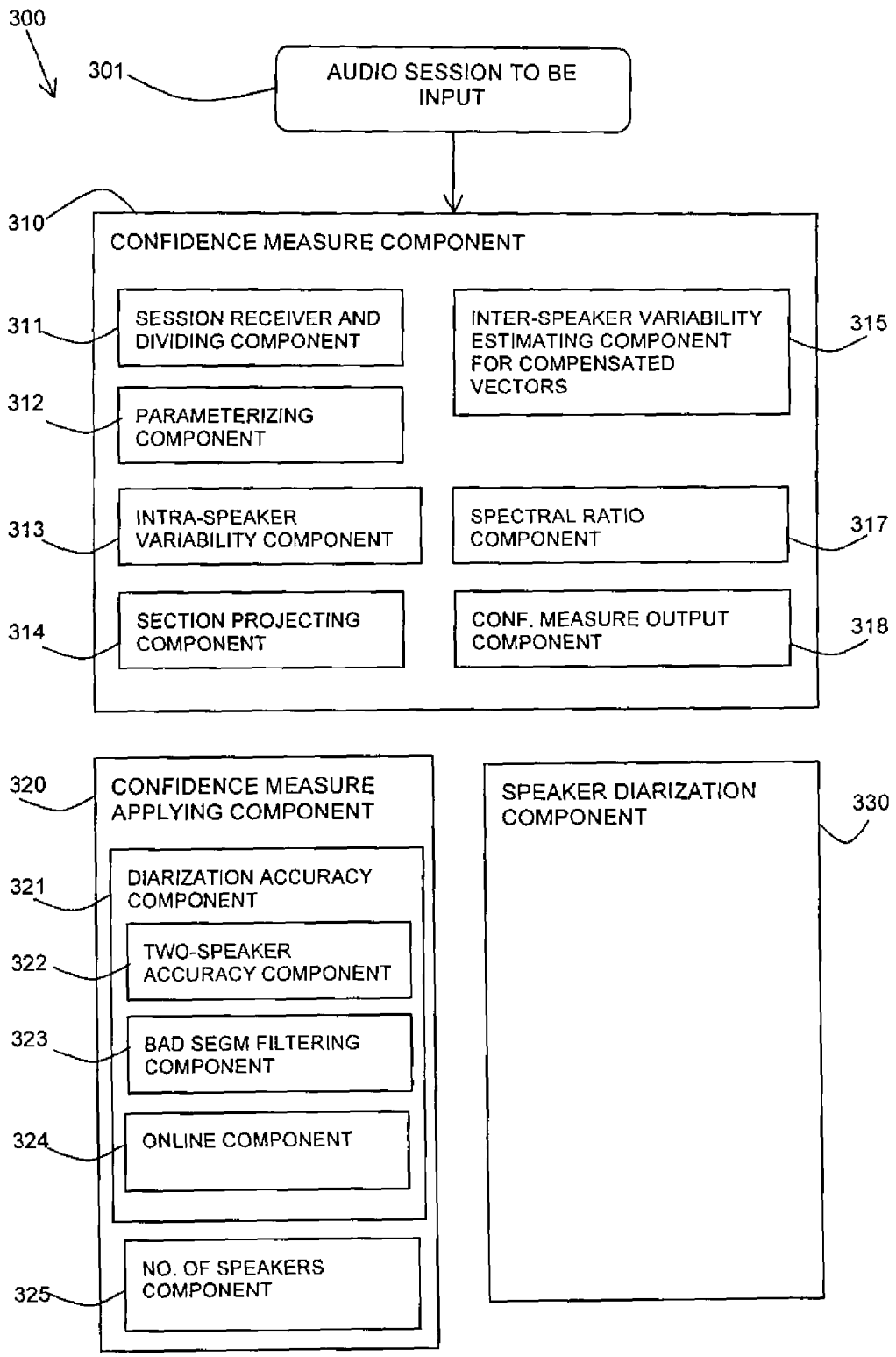
FIG. 3 is a block diagram of a diarization system in accordance with the present invention.

Referring to FIG. 3, a block diagram shows an embodiment of the described system of providing a confidence measure for speaker diarization.

An audio session to be input may be provided 310 as an unsegmented audio file, for example, a speaker session of two or more speakers. Any length of audio session may be input on which a confidence measure is required.

A confidence measure component 310 may be provided for generating a confidence measure for the audio session to be input 301. The confidence measure component may include the following components.

A session receiving and dividing component 311 for receiving and dividing the audio session into sections. A parameterizing component 312 may provided for parameterizing each section, for example, by a GMM.

An intra-speaker variability component 313 may be provided for creating a basis for the intra-speaker variability using a Principal Component Analysis (PCA) technique. A section projecting component 314 may project all sections according to the basis created by component 313.

An inter-speaker variability estimating component 315 may be provided for estimating inter-speaker variability in projected space on the compensated vectors. This may include creating a basis for the inter-speaker variability on the compensated vectors using PCA.

A spectral ratio component 317 may be provided for computing the spectral ratio of the PCA which is the ratio between the largest eigenvalue and the second largest eigenvalue.

A confidence measure output component 318 may be provided to output the confidence measure determined by component 317 for the audio session.

A confidence measure applying component 320 may be provided for applying the output confidence measure of the confidence measure component 310 in different ways. The confidence measure applying component 320 may include one or more of the following components which apply the confidence measure in different ways.

A diarization accuracy component 321 may apply the confidence measure to determine the accuracy of a speaker diarization, for example as carried out by a speaker diarization component 330 on the audio session.

The diarization accuracy component 321 may include a two-speaker accuracy component 322 in which the confidence measure correlates with the diarization accuracy and can be used to measure the goodness of the segmentation of the diarization.

A bad segment filtering component 323 may be provided in which the confidence measure may be used to filter out some bad segmentation outputs and by doing so increase the diarization accuracy on the remaining calls.

An online component 324 may be provided for improving online processing by determining if an initial segment is too short and more audio data is needed before segmentation is performed.

A number of speakers component 325 may also be provided and in conversations with more than two speakers, the confidence measure may help in determining the number of speakers in the call.

Figure 4:
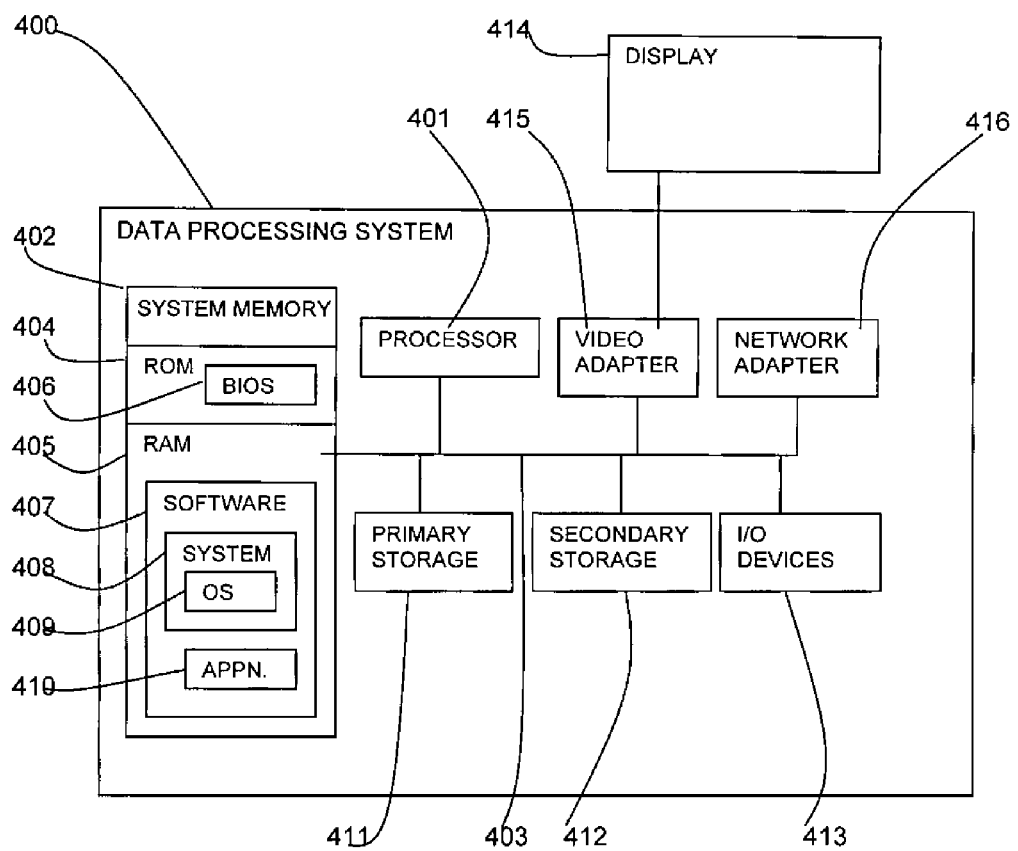
FIG. 4 is a block diagram of a computer system in which the present invention may be implemented.

Referring to FIG. 4, an exemplary system for implementing aspects of the invention includes a data processing system 400 suitable for storing and/or executing program code including at least one processor 401 coupled directly or indirectly to memory elements through a bus system 403. The memory elements can include local memory employed during actual execution of the program code, bulk storage, and cache memories which provide temporary storage of at least some program code in order to reduce the number of times code must be retrieved from bulk storage during execution.

The memory elements may include system memory 402 in the form of read only memory (ROM) 404 and random access memory (RAM) 405. A basic input/output system (BIOS) 406 may be stored in ROM 404. System software 407 may be stored in RAM 405 including operating system software 408. Software applications 410 may also be stored in RAM 405.

The system 400 may also include a primary storage means 411 such as a magnetic hard disk drive and secondary storage means 412 such as a magnetic disc drive and an optical disc drive. The drives and their associated computer-readable media provide non-volatile storage of computer-executable instructions, data structures, program modules and other data for the system 400. Software applications may be stored on the primary and secondary storage means 411, 412 as well as the system memory 402.

The computing system 400 may operate in a networked environment using logical connections to one or more remote computers via a network adapter 416.

Input/output devices 413 can be coupled to the system either directly or through intervening I/O controllers. A user may enter commands and information into the system 400 through input devices such as a keyboard, pointing device, or other input devices (for example, microphone, joy stick, game pad, satellite dish, scanner, or the like). Output devices may include speakers, printers, etc. A display device 414 is also connected to system bus 403 via an interface, such as video adapter 415.

Confidence measure for speaker diarization may be provided as a service to a customer over a network.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A computer implemented method for providing a confidence measure for speaker diarization, comprising:
    receiving an audio session as unsegmented audio data;
    computing a spectral ratio of principal component analysis (PCA) of sections of the received audio session by a ratio between the largest eigenvalue and the second largest eigenvalue;
    using the PCA spectral ratio as a confidence measure for speaker diarization processing.

2. The method as claimed in claim 1, wherein computing a spectral ratio of principal component analysis includes:
    dividing the session into sections;
    parameterizing each section by a time dependent probability density function to define a supervector space;
    creating a basis for the intra-speaker variability using principal component analysis (PCA);
    projecting all the sections according to the basis to provide compensated vectors;
    estimating the inter-speaker variability of the sections in projected space;
    creating a basis for the inter-speaker variability on the compensated vectors using PCA.

3. The method as claimed in claim 1, wherein using the PCA spectral ratio as a confidence measure for speaker diarization includes:

determining if the spectral ratio is a large value indicating that the separation of two speakers is good; and
determining if the spectral ratio is a low value indicating that the separation is not good.

4. The method as claimed in claim 1, including:
using the confidence measure for filtering out bad segmentations in two-speaker diarization.

5. The method as claimed in claim 1, including:
using the confidence measure for guiding online diarization.

6. The method as claimed in claim 1, including:
using the confidence measure to classify between single speaker and two speaker utterances.

7. The method as claimed in claim 2, wherein parameterizing each section by a time dependent probability density function to define a supervector space uses a Gaussian Mixture Model.

8. The method as claimed in claim 2, wherein creating a basis for the intra-speaker variability using PCA includes:
computing the difference between each two consecutive supervectors;
estimating a scatter measure of the difference vectors;
applying PCA to the scatter measure and retaining the first n eigenvalues.

9. The method as claimed in claim 8, wherein projecting all the sections according to the basis includes:
compensating each original supervector by removing the projection of each original supervector on selected n eigenvectors of the PCA.

10. The method as claimed in claim 2, wherein estimating the inter-speaker variability of the sections in projected space, includes:
computing a scatter measure of the compensated supervectors; and
applying PCA to the scatter measure.

11. The method as claimed in claim 2, wherein dividing a speech session into sections divides the speech session into evenly spaced overlapping sections.

12. A computer program product for providing a confidence measure for speaker diarization, the computer program product comprising:
a non-transitory computer readable storage medium having computer readable program code embodied therewith, the computer readable program code comprising:
computer readable program code configured to:
receive an audio session as unsegmented audio data;
compute a spectral ratio of principal component analysis (PCA) of sections of the received audio session by a ratio between the largest eigenvalue and the second largest eigenvalue;
use the PCA spectral ratio as a confidence measure for speaker diarization processing.

13. A system for providing a confidence measure for speaker diarization, comprising:
a processor;
a session receiver and dividing component for receiving an audio session as unsegmented audio data and dividing it into sections;
a spectral ratio component for computing a spectral ratio of principal component analysis (PCA) of the sections of the received audio session by a ratio between the largest eigenvalue and the second largest eigenvalue;
a confidence measure applying component for using the PCA spectral ratio as a confidence measure for speaker diarization processing.

14. The system as claimed in claim 13, including a confidence measure component including:
a parameterizing component for parameterizing each section by a time dependent probability density function to define a supervector space;
an intra-speaker variability component for creating a basis for the intra-speaker variability using principal component analysis (PCA);
a section projecting component for projecting all the sections according to the basis to provide compensated vectors;
an inter-speaker variability estimating component for estimating the inter-speaker variability of the sections in projected space for creating a basis for the inter-speaker variability on the compensated vectors using PCA.

15. The system as claimed in claim 13, wherein a confidence measure applying component for using the PCA spectral ratio as a confidence measure for speaker diarization processing includes:
determining if the spectral ratio is a large value indicating that the separation of two speakers is good; and
determining if the spectral ratio is a low value indicating that the separation is not good.

16. The system as claimed in claim 13, wherein a confidence measure applying component for using the PCA spectral ratio as a confidence measure for speaker diarization processing includes:
a bad segment filtering component for using the confidence measure for filtering out bad segmentations in two-speaker diarization.

17. The system as claimed in claim 13, wherein a confidence measure applying component for using the PCA spectral ratio as a confidence measure for speaker diarization processing includes:
an online component for using the confidence measure for guiding online diarization.

18. The system as claimed in claim 13, wherein a confidence measure applying component for using the PCA spectral ratio as a confidence measure for speaker diarization processing includes:
a number of speakers component for using the confidence measure to classify between single speaker and two speaker utterances.

19. The system as claimed in claim 14, wherein the parameterizing component parameterizes each section using a Gaussian Mixture Model.

20. The system as claimed in claim 14, wherein the intra-speaker variability component is for:
computing the difference between each two consecutive supervectors;
estimating a scatter measure of the difference vectors;
applying PCA to the scatter measure and retaining the first n eigenvalues.

21. The system as claimed in claim 14, wherein the section projecting component is for:
compensating each original supervector by removing the projection of each original supervector on selected n eigenvectors of the PCA.

22. The system as claimed in claim 14, wherein the inter-speaker variability estimating component is for:
computing a scatter measure of the compensated supervectors; and
applying PCA to the scatter measure.

23. The system as claimed in claim 13, wherein the session receiver and dividing component divides the speech session into evenly spaced overlapping sections.

* * * * *